J. A. HOLLEM.
Animal-Trap.

No. 224,910. Patented Feb. 24, 1880.

WITNESSES:
F. McArdle
C. Sedgwick

INVENTOR:
J. A. Hollem
BY Munn & Co
ATTORNEYS.

N. PETERS, PHOTO-LITHOGRAPHER, WASHINGTON, D. C.

UNITED STATES PATENT OFFICE.

JOHN A. HOLLEM, OF NEW YORK, N. Y.

ANIMAL-TRAP.

SPECIFICATION forming part of Letters Patent No. 224,910, dated February 24, 1880.

Application filed September 1, 1879.

*To all whom it may concern:*

Be it known that I, JOHN A. HOLLEM, of New York, in the county of New York and State of New York, have invented a new and Improved Animal-Trap, of which the following is a specification.

Figure 1:
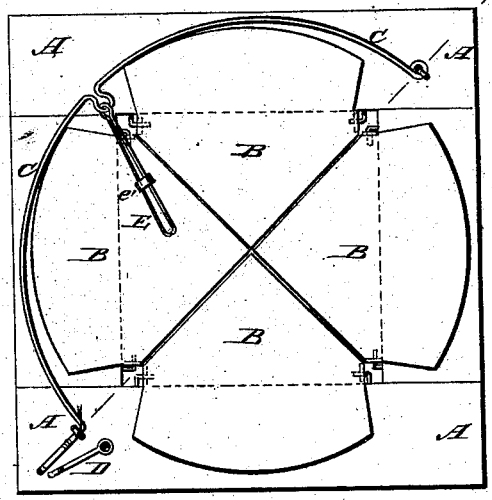
Figure 2:
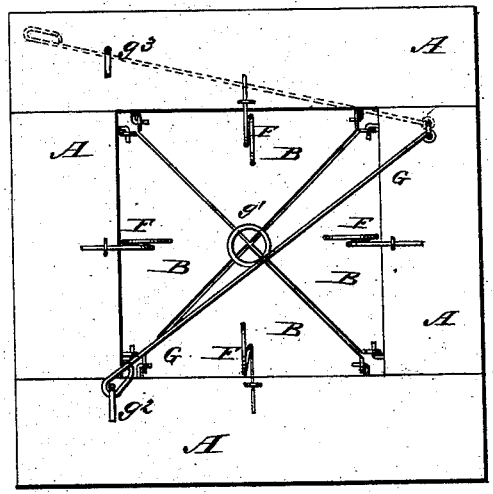
Figure 3:
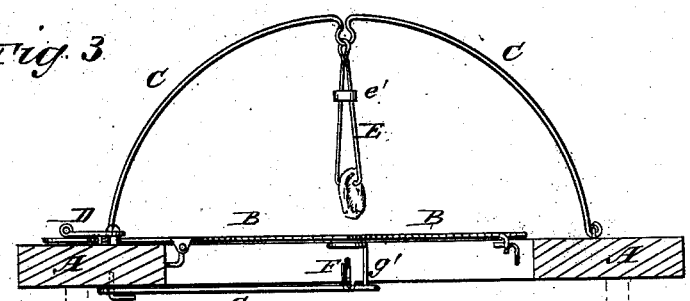

Figure 1 is a top view of my improved trap. Fig. 2 is a bottom view of the same. Fig. 3 is a detail section of the same, taken through the line $x\,x$, Fig. 1.

Similar letters of reference indicate corresponding parts.

The object of this invention is to furnish an improved trap for catching rats, mice, gophers, and other animals, which shall be so constructed as to catch an unlimited number of animals in succession, and which shall be simple in construction and convenient in use.

The invention consists in a lock bar or rod that is pivoted to an outer plate, has a middle stop which supports inner pivoted plates, and engages at the free end with hook-fastenings; also, in a hinged bail having flattened end and locked in an upright position by a button, all as hereinafter described.

A represents a frame or plate of sufficient size to cover a barrel, pail, or other vessel capable of containing water. The plate or frame A has a square or polygonal hole through it of a greater or less size, as may be desired, or as the size of the animals trapped for may require.

B are plates, the inner parts of which are made angular, so that they may meet in the center of the frame A. The outer parts of the plates B are made in the form of sections of circles. The side corners of the plates B are cut off, and to the edges of the said plates, at the inner ends of the said cuts, are attached, or upon them are formed, lugs to receive pivots attached to the frame A.

With this construction the axes of the plates B will be upon the inner side of their centers of gravity, so that their outer parts will be the heavier, and will hold them in a horizontal position without being weighted.

To the opposite corners of the frame A are pivoted the ends of a bail, C, one of which ends is flattened, so that when the said bail is turned up into a vertical position a button, D, pivoted to the frame A, may be turned over the said flattened end to lock the said bail in place.

In the center of the bail C is formed an eye to receive the eye of the bait-clamp E, which is formed of a piece of wire having an eye formed in its center, and having its ends bent inward at right angles, to serve as hooks for holding the bait. The arms of the clamp E, when left free, incline from each other and are drawn toward each other and held to clamp the bait between their hooked ends by a slide, $e'$, which may be moved up and down upon them, as may be required.

To the inner edges of the sides of the frame A are attached spring-stops F, for the sectional plates B to strike against when swung downward to prevent them from swinging past a vertical position, and to give them an impulse to cause them to return promptly to a horizontal position.

G is a rod which crosses the lower side of the frame A, and is pivoted at one end to the said frame. Upon the middle part of the rod G is framed a stop, $g'$, to rest against the under side of the angles of the hinged plates B and support them in a horizontal position.

The rod G is designed for use when trapping cautious animals, to hold the plates B firmly in place until the animals have become accustomed to the trap, and will pass upon the said plates fearlessly to get the bait. The rod G is then swung to one side and secured, and the trap is set.

The free end of the lock-rod G is secured in either position by hooks $g^2\,g^3$ attached to the frame A.

In using the trap the frame A is designed to be placed over a barrel, pail, or other vessel partly filled with water and sunk in the ground, or otherwise arranged so that the animals can readily pass upon the trap.

With this construction, as soon as an animal has passed the axis of one of the plates B it will tilt and project the animal into the water beneath, and should he catch upon or even touch any of the other plates, they also will tilt, so that the animal cannot save himself from falling.

Having thus described my invention, I claim as new and desire to secure by Letters Patent—

1. The rod G, pivoted on one side of plate A, provided with median stop $g'$, and engaging with fastenings $g^2$ $g^3$, as and for the purpose specified.

2. The flattened end of the hinged bail C, in combination with the button D, for locking the said bail in an upright position, substantially as herein shown and described.

JOHN A. HOLLEM.

Witnesses:
JAMES T. GRAHAM,
C. SEDGWICK.